(12) United States Patent
Ahci-Ezgi et al.

(10) Patent No.: US 8,985,958 B2
(45) Date of Patent: Mar. 24, 2015

(54) CONNECTION MEANS

(75) Inventors: Elif Ahci-Ezgi, Munich (DE); Rupert Pfaller, Riemerling (DE); Lukas Schimke, Unterhaching (DE); Wolfgang Wagner, Inning am Holz (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 611 days.

(21) Appl. No.: 13/287,743

(22) Filed: Nov. 2, 2011

(65) Prior Publication Data
US 2012/0134835 A1 May 31, 2012

(30) Foreign Application Priority Data

Nov. 25, 2010 (EP) .................................. 10400058

(51) Int. Cl.
*B63H 1/20* (2006.01)
*B64C 27/48* (2006.01)

(52) U.S. Cl.
CPC ...................................... *B64C 27/48* (2013.01)
USPC .................... 416/204 R; 416/207; 416/210 R

(58) Field of Classification Search
USPC ............................ 416/204 R, 205, 207, 210 R
See application file for complete search history.

(56) References Cited

U.S. PATENT DOCUMENTS

| | | | |
|---|---|---|---|
| 2,336,012 A | 12/1940 | Hackethal | |
| 3,056,456 A * | 10/1962 | Michel et al. | 416/143 |
| 3,310,120 A * | 3/1967 | Vacca | 416/103 |
| 4,340,335 A * | 7/1982 | Cheney | 416/138 |
| 4,373,862 A | 2/1983 | Ferris et al. | |
| 5,364,230 A * | 11/1994 | Krauss et al. | 416/134 A |
| 5,645,400 A | 7/1997 | Hunter et al. | |
| 6,126,398 A | 10/2000 | Bauer et al. | |
| 2009/0155086 A1 | 6/2009 | Parisy | |

FOREIGN PATENT DOCUMENTS

| | | | | |
|---|---|---|---|---|
| EP | 1486415 A1 | 12/2004 | | |
| FR | 1117935 | * 1/1955 | | |
| FR | 1117935 A | 5/1956 | | |
| GB | 656797 | * 9/1951 | ............. | B64C 11/04 |
| GB | 656797 A | 9/1951 | | |
| GB | 909617 A | 10/1962 | | |
| RU | 2230003 C1 | 6/2004 | | |
| WO | 0066429 A1 | 11/2000 | | |
| WO | 2010082936 A1 | 7/2010 | | |

OTHER PUBLICATIONS

European Search Report and Written Opinion, May 12, 2011, Aplication No. EP 10400058, Leonardo Raffaelli.*
Search Report and Written Opinion; Dated May 12, 2011: Application No. EP 10400058.

* cited by examiner

*Primary Examiner* — Dwayne J White
*Assistant Examiner* — Jason Fountain
(74) *Attorney, Agent, or Firm* — Brooks Kushman P.C.

(57) ABSTRACT

A connection means (1) for mounting a rotor blade (2) to a rotor hub, particularly for mounting a rotor blade (2) to a rotor hub of a helicopter, with at least two bolts (4, 5) inserted vertically relative to a main plane of said rotor blade (2) into an end (7) of said rotor blade (2) that is generally directed towards the rotor hub. At least two bolts (4, 5) are arranged distant from each other along a longitudinal axis (6) of said rotor blade (2) to said rotor hub.

14 Claims, 2 Drawing Sheets

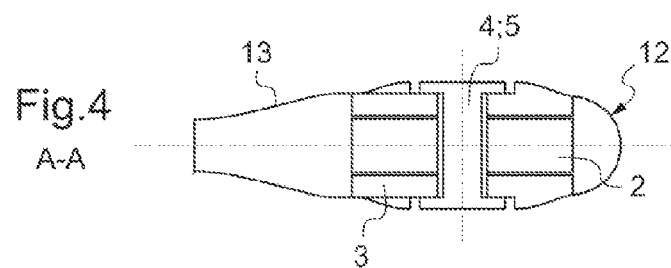
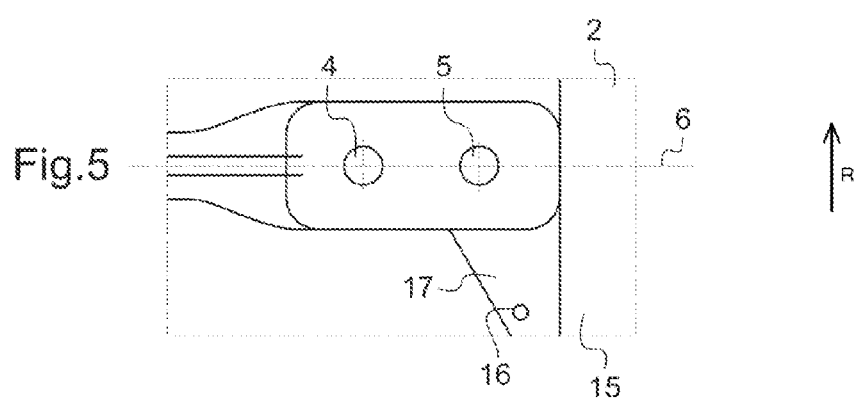
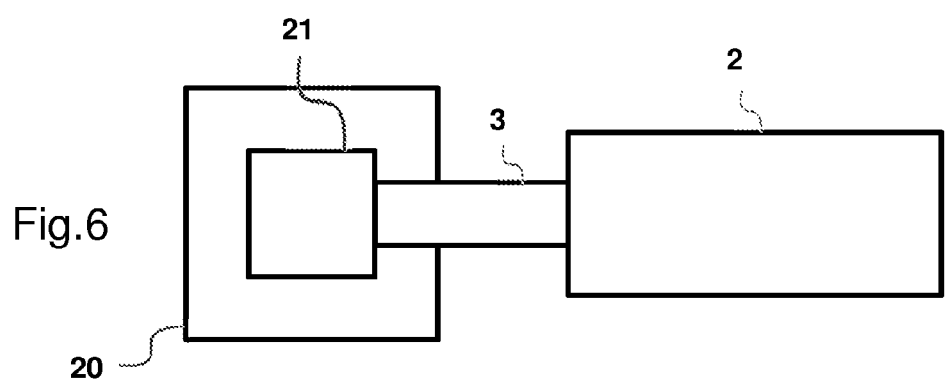

CONNECTION MEANS

CROSS REFERENCE TO RELATED APPLICATION

This application claims priority to EP 10 400 058.3 filed on Nov. 25, 2010, the disclosure of which is incorporated in its entirety by reference herein.

BACKGROUND OF THE INVENTION (1) Field of the Invention

The invention is related to connection means for a rotor blade to a rotor hub, particularly for a helicopter.

(2) Description of Related Art

Rotor blade connections to the rotor hub are highly loaded by centrifugal force and bending from lead/lag, flapping and torsion moments rendering the rotor blade connections actually one of the critical parts for function and properties of main rotors. In order to achieve a maximum of performance and safety, the general design target is to reduce the rotor blade connection to a minimum cross section for minimized drag and weight with fail safe features and damage tolerant failure mode.

It is known to connect the rotor hub to the rotor blade by means of two bolts arranged side by side in transverse direction to a longitudinal axis from the rotor blade to the rotor hub. Said arrangement of the bolts results in unfavourable stress distribution in the rotor blade connection. With two bolts side by side and offset from the longitudinal axis from the rotor blade to the rotor hub the direction of the force flow between the rotor hub and the rotor blade changes with the consequence of delamination in the neck of the blade connection. Said offset arrangement of the bolts calls for reinforced connection means with bigger cross sections and results consequently in bulky connection means with inappropriate aerodynamic drag.

The document FR 1 117935 A discloses a mounting device for a rotor blade of an aircraft. The rotor blade is fixed to a support linked to a rotor hub by means of a joint having an axis in line with the general orientation of the axis of rotation of the rotor.

The document US 2009155086 A1 discloses a rotorcraft rotor blade with a blade root and a free end opposite from the blade root, the blade being provided at least with a spar laid flat on a suction-side face and a pressure side-face of the blade, the main spar being secured to an attachment fitting at the blade root. The attachment fitting then includes first and second horizontal fastener bushings, the first and second fastener bushings being both perpendicular to the span of the blade and substantially perpendicular to an elevation direction (Z) that is substantially parallel to gravity (W), the elevation direction (Z) being perpendicular to the span.

The document U.S. Pat. No. 2,336,012 A discloses a propeller assembly, a hub, a blade having a root face of airfoil section and a shank member serving to mount the blade upon the hub, a transverse flange on the shank member for engaging the root end face of the blade.

The document GB 909617 A discloses a metal rotor blade having an extruded hollow spar forming the leading edge and having attached thereto a plurality of tapered pockets. The airfoil outboard portion of the spar is of substantially uniform cross-section and the inboard portion having varying internal dimensions and thinner top and bottom walls than the outboard portion, the inboard portion having flat upper and lower surfaces and gradually merging with the outboard portion. Root plates are bonded to the flat upper and lower surfaces; bolts holding the plates to the spar do not contact the plates. Load is transferred from the blade to the plates by the bonded joint, or should this joint fail then in shear by bolts. The plates are spaced apart by two spacers and a diaphragm and sealing strip seal the inboard end of the spar.

The document U.S. Pat. No. 4,340,335 A discloses a helicopter tail rotor of flexrotor or composite bearingless rotor design, a control wheel member being positioned in spaced relationship to the torque tube at the blade inner end and being connected thereto by pivotal push-pull rods connected at one of their ends to the control wheel member and at their opposite ends to the leading edge and trailing edge of the torque tube so that, as the control wheel member is selectively caused to rotate relative to the blade, one push-pull rod pulls upon the torque tube while the other push-pull rod pushes upon the torque tube to cause the torque tube to rotate, and hence the flexible spar to which it is attached to twist to thereby selectively change the blade pitch angle.

The document GB 656797 A discloses a non-metallic propeller blade being attached to a metallic blade root so as to allow slight radial and axial movements. Sheets of rubber are placed between the blade and the metal plate of the root, being vulcanized to both. Fastenings comprising a bolt held in conical washers in the blade and surrounded by a cylinder secured in the root plate, the intervening space being filled with rubber. In a modification the root plate is formed with transverse ribs and with interfitting recesses in the blade, the space between these being filled with rubber.

SUMMARY OF THE INVENTION

It is an object of the present invention to provide for connection means between a rotor blade and a rotor hub, particularly a rotor blade and a rotor hub of a helicopter, with minimized cross-section and improved use of the design space for better aerodynamic performance.

The solution is provided with connection means between a rotor blade and a rotor hub with the features of claim 1. Preferred embodiments of the invention are presented in the subclaims.

According to the invention connection means between a rotor blade and a rotor hub, particularly for a helicopter, comprise at least two bolts at an end of said rotor blade. At least two bolts are arranged distant from each other along a longitudinal axis of said rotor blade towards said rotor hub. Said bolts in a row are approximately in the axis of the centrifugal forces and this aligned arrangement of the bolts results in a favourable force flow between the rotor hub and the rotor blade without changes of the direction of the centrifugal forces with the consequence of optimized stresses in the inventive connection means for a reduced width allowing to build a narrower connection. The inventive connection means allows higher edge distances of the aligned bolts for an improved damage tolerant fail safe configuration. Said fail safe feature is provided as well with the two bolts in a row where each one can carry the full centrifugal load acting on one rotor blade on its own and where each of the bolts offers a back up function for unbalanced centrifugal loads on the other bolt in the row.

According to a preferred embodiment of the invention the connection means comprise an intermediate beam element provided between said end of said rotor blade, that is generally directed towards the rotor hub, and said rotor hub. Said intermediate beam element is preferably provided with two essentially longitudinal sides being opposed to each other and encompassing coaxially the end of said rotor blade that is generally directed towards the rotor hub or the end of said rotor blade, that is generally directed towards the rotor hub, is provided with longitudinal sides opposed to each other which encompass coaxially an end of said intermediate beam element pointing away from the rotor hub.

According to a further preferred embodiment of the invention the two longitudinal sides and the coaxially encompassed end are each provided with a tapered transition between said two bolts in the direction of the longitudinal axis of said rotor blade towards said rotor hub for the effective use of the cross-sections with approximately equal stresses in all cross sections allowing reduced cross sections towards the respective ends of the two longitudinal sides and the coaxially encompassed end and thus allowing to build a connection with lower height for less aerodynamic drag of the connection means.

According to a further preferred embodiment of the invention the tapered transitions of the two longitudinal sides are essentially parallel to the tapered transitions of the coaxial free end.

According to a further preferred embodiment of the invention the two bolts are preferably slightly offset relative to the longitudinal axis of said rotor blade to said rotor hub with a resulting bigger distance between said two bolts and consequently an improved torsional stiffness and an improved stiffness in lead-lag direction of the rotor blade. In spite of an increased width, said embodiment of the inventive connection means is anyway smaller than any of the connection means known from the state of the art.

According to a further preferred embodiment of the invention at least one fairing is provided said at least one fairing encompassing at least one of the bolts for reduced aerodynamic drag.

According to a further preferred embodiment of the invention at least one third bolt is arranged distant from the two other bolts and arranged parallel to the longitudinal axis of said rotor blade towards said rotor hub for improved lead-lag stiffness and increased safety of the rotor blade assembly.

According to a further preferred embodiment of the invention the lead-lag stiffness of the rotor blade is improved by a third bolt which connects the rotor blade to a control cuff offset from the longitudinal axis next to a trailing edge of said rotor blade. Said third bolt is additional to the two bolts arranged parallel to the longitudinal axis of said rotor blade. The damping function of a lead-lag damper and the blade folding of the rotor blade can be improved by this third bolt.

BRIEF DESCRIPTION OF THE DRAWINGS

A preferred embodiment of the invention is described in the following description with reference to the attached drawings.

FIG. 4 shows a schematic view of a cross section (marked in FIG. 2) vertical to the longitudinal axis of the rotor blade of FIG. 1, FIG. 5 shows a schematic top view of a third embodiment of a rotor blade assembly according to the invention; and FIG. 6 shows a schematic top view of a helicopter having a rotor blade assembly according to the invention.

DETAILED DESCRIPTION OF THE PREFERRED EMBODIMENTS

Figure 1:
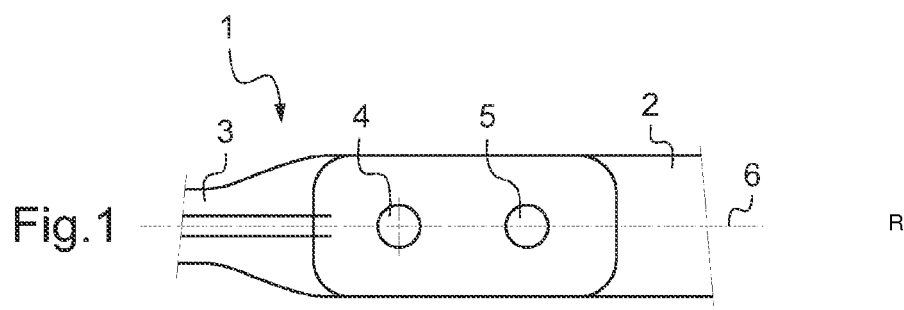
FIG. 1 shows a schematic top view of a connection means according to the invention.

According to FIG. 1 and FIG. 6 a connection means 1 for a helicopter 20 is provided for mounting a rotor blade 2 to an intermediate beam element 3, said intermediate beam element 3 being mounted to a rotor hub 21. Two pin-type metal bolts 4, 5 with diameter d are arranged in the intermediate beam element 3 and the rotor blade 2 with a distance of about 1.5×d to 5×d between each other along a longitudinal axis 6 of said rotor blade 2 towards said rotor hub 21. The intermediate beam element 3 and the rotor blade 2 are made of reinforced composite materials.

Figure 2:
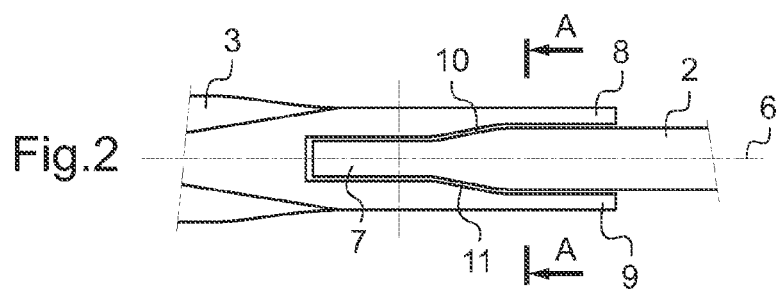
FIG. 2 shows a schematic lateral view perpendicular to the longitudinal axis of the rotor blade of FIG. 1.

According to FIG. 2 the two bolts 4, 5 are mounted vertically to an essentially flat main plane of said rotor blade 2. The intermediate beam element 3 comprises two essentially longitudinal sides 8, 9 opposed to each other, which encompass coaxially an end 7 of said rotor blade 2 oriented to said rotor hub. The two longitudinal sides 8, 9 and the coaxial free end 7 are each provided with a respective tapered transition 10, 11 decreasing in the direction towards the rotor hub along the longitudinal axis 6 of said rotor blade 2 between said two bolts 4, 5. The bolts 4, 5 are arranged in bushings (not shown) in the intermediate beam element 3 and the rotor blade 2.

The distribution of the centrifugal force between the two bolts 4, 5 in a row is nearly 50/50% with the bypass and load transfer loaded sections being located at bolt 4 for the longitudinal sides 8, 9 of the intermediate beam element 3 and at bolt 5 for the end 7 of the rotor blade 2 oriented to said rotor hub.

Figure 3A:
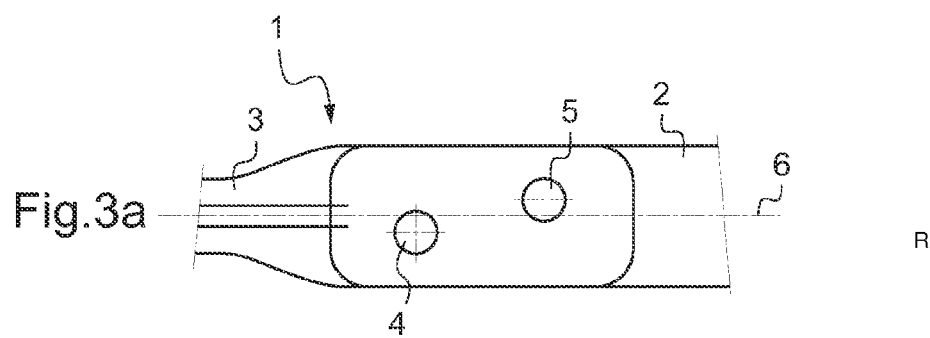
FIG. 3a shows a schematic top view of a second embodiment with offset bolts of the connection means according to the invention.

According to FIG. 3a the two bolts 4, 5 are offset from the longitudinal axis 6 of said rotor blade 2 with each of the respective diameters intersecting the longitudinal axis 6 from an opposed side.

Figure 3B:
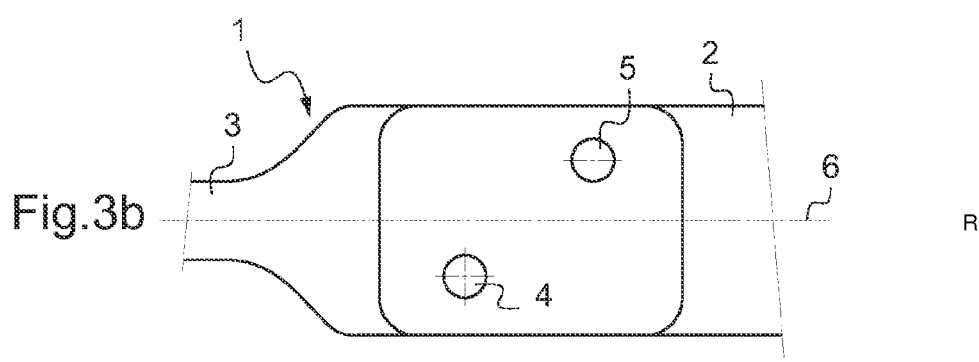
FIG. 3b shows a schematic top view of a variation of the second embodiment according to the invention.

According to FIG. 3b the two bolts 4, 5 are offset from the longitudinal axis 6 of said rotor blade 2 with each of the respective diameters with distance to the longitudinal axis 6 from an opposed side.

According to FIG. 4 fairings 12, 13 are provided covering the two bolts 4, 5 of said connection means 1 for less drag during rotation of the rotor blade 2 in a direction R, illustrated in FIGS. 1, 3a, 3b, and 5. The fairing 12 is situated at a leading edge and the fairing 13 at a trailing edge 15 of the rotor blade 2.

According to FIG. 5 a blade connection bolt 16 is provided which connects the rotor blade 2 and a control cuff 17 offset from the longitudinal axis 6 next to a trailing edge 15 of said rotor blade 2. The blade connection bolt 16 is a third bolt in addition to the two bolts 4, 5 aligned along the longitudinal axis 6 of said rotor blade 2.

According to an alternative embodiment of the invention (not shown) the rotor blade is provided at its end, oriented to said rotor hub, with two essentially longitudinal sides opposed to each other, which encompass coaxially an end from said rotor hub.

What is claimed is:

1. Connection means for mounting a rotor blade to a rotor hub of a helicopter, comprising:
    an intermediate beam element mounted between a first end of the rotor blade and the rotor hub with two intermediate beam element bolts inserted vertically relative to a main plane of the rotor blade into the first end of the rotor blade, the two intermediate beam element bolts being spaced from each other along a longitudinal axis of the rotor blade, the intermediate beam element having two essentially longitudinal sides being opposed to each other and encompassing coaxially the first end of the rotor blade;

at least one fairing encompassing at least one of the intermediate beam element bolts;

a control cuff, the control cuff being offset from the longitudinal axis next to a trailing edge of the blade; and a blade connection bolt which connects the rotor blade to the control cuff, the blade connection bolt being in addition to the two intermediate beam element bolts, wherein the two longitudinal sides and the first end are each provided with a tapered transition between the two intermediate beam element bolts in the direction of the longitudinal axis of the rotor blade towards the rotor hub.

2. The connection means according to claim 1, wherein the tapered transitions of the two longitudinal sides are essentially parallel to the tapered transitions of the first end.

3. The connection means according to claim 1, wherein aside from the two intermediate beam element bolts, no other bolts directly connect the rotor blade to the intermediate beam element.

4. A rotor blade assembly comprising:

a hub having an axis of rotation;

a rotor blade defining a span and a plane of rotation, the blade having a longitudinal axis oriented along the span, a first lateral axis extending normal to the longitudinal axis in the plane of rotation and being spaced a first distance from the axis of rotation, and a second lateral axis extending normal to the longitudinal axis in the plane of rotation and being spaced a second distance from the axis of rotation, the second distance being greater than the first distance, the rotor blade having a first end;

an intermediate member having a first end and a second end, the first end being coupled to the hub and the second end being coupled to the rotor blade, the second end of the intermediate member defining a first long side and a second long side;

a first bolt coupling the second end to the rotor blade, the first bolt being oriented generally parallel to the axis of rotation and intersecting the first lateral axis, wherein no other bolts connecting the rotor blade and intermediate member intersect the first lateral axis; and a second bolt coupling the second end to the rotor blade, the second bolt being oriented generally parallel to the axis of rotation and intersecting the second lateral axis, wherein no other bolts connecting the rotor blade and intermediate member intersect the second lateral axis, the long sides and the first end of the rotor blade each including a tapered transition between the first and second bolts in the direction of the longitudinal axis of the rotor blade towards the hub.

5. The rotor blade assembly of claim 4, wherein the first and second long sides are separated by a cavity, and wherein the first end of the rotor blade is retained within the cavity by the first and second bolts.

6. The rotor blade assembly of claim 4, further comprising a first fairing covering the first bolt and a second fairing covering the second bolt.

7. The rotor blade assembly of claim 4, wherein the first bolt intersects the longitudinal axis and the second bolt intersects the longitudinal axis.

8. The rotor blade assembly of claim 4, wherein no other bolt directly couples the intermediate member to the blade.

9. The rotor blade assembly of claim 4, further comprising a control cuff, the control cuff being offset from the longitudinal axis, and a third bolt coupling the control cuff to the blade.

10. A helicopter comprising:

a rotor hub having an axis of rotation;

a rotor blade having a hub end, a tip end, a longitudinal axis extending from the hub end to the tip end; and an intermediate member having a first end and a second end, the first end being coupled to the rotor hub, and the second end being coupled to the hub end of the rotor blade by a first bolt and a second bolt, the second end of the intermediate member defining a first long side and a second long side, the first bolt being spaced a first distance from the axis of rotation and the second bolt being spaced a second distance from the axis of rotation, the second distance being greater than the first distance, wherein no bolt other than the first bolt connects the second end to the hub end at the first distance from the axis of rotation and no bolt other than the second bolt connects the second end to the hub end at the second distance from the axis of rotation, the long sides and the hub end of the rotor blade each including a tapered transition between the first and second bolts in direction of the longitudinal axis of the rotor blade towards the hub.

11. The helicopter of claim 10, wherein the first bolt and the second bolt pass through the longitudinal axis.

12. The helicopter of claim 10, wherein the first and second long sides are separated by a cavity, and wherein the hub end of the rotor blade is retained within the cavity by the first and second bolts.

13. The helicopter of claim 10, further comprising a first fairing covering the first bolt and a second fairing covering the second bolt.

14. The helicopter of claim 10, further comprising a control cuff, the control cuff being offset from the longitudinal axis, and a third bolt coupling the control cuff to the blade.

* * * * *